United States Patent [19]

Ambrosius

[11] 4,292,541
[45] Sep. 29, 1981

[54] SAFEGUARD OR LOCK DEVICE

[76] Inventor: Bernd Ambrosius, In der Au 4-12, 6000 Frankfurt/Main-Rödelheim, Fed. Rep. of Germany

[21] Appl. No.: 103,176

[22] Filed: Dec. 13, 1979

Related U.S. Application Data

[63] Continuation of Ser. No. 915,403, Jun. 14, 1978.

[30] Foreign Application Priority Data

Jun. 14, 1977 [DE] Fed. Rep. of Germany ....... 2726737

[51] Int. Cl.³ ............................................. B60R 25/04
[52] U.S. Cl. ................................ 307/10 AT; 180/287; 361/171; 361/176; 340/64
[58] Field of Search .................. 307/10 AT; 361/171, 361/172, 173, 174, 175, 176, 177; 180/287, 288, 289; 340/63, 64

[56] References Cited

U.S. PATENT DOCUMENTS

| | | | |
|---|---|---|---|
| 3,383,513 | 4/1968 | Douglas | 361/176 X |
| 3,634,880 | 1/1972 | Hawkins | 361/171 X |
| 3,796,889 | 3/1974 | Fradkin et al. | 361/172 X |
| 3,851,504 | 12/1974 | Theobald | 307/10 AT X |
| 3,870,895 | 3/1975 | Lax et al. | 307/10 AT |
| 3,872,435 | 3/1975 | Cestaro | 361/172 X |
| 3,896,345 | 7/1975 | Zink | 361/172 |
| 3,940,738 | 2/1976 | Teeters | 361/172 X |

Primary Examiner—L. T. Hix
Assistant Examiner—James L. Dwyer
Attorney, Agent, or Firm—Friedman, Goodman & Teitelbaum

[57] ABSTRACT

A device for safeguarding an engine against unauthorized use, the device including a unit structure for housing the engine starter, the starter mechanism switch and a code signal receiver therein to prevent access thereto. The code signal receiver includes a decoder to determine an authorized preselected code signal combination, upon receipt of which, the decoder activates the starter mechanism switch. A code signal generator transmits the code signal combination to the code signal receiver upon receiving a proper code transmitter key therein. The code transmitter key is provided with a series of displayable sections thereon to determine the code signal combination. Preferably, the code signal receiver includes a time delay to block forwarding of a following code signal combination for a predetermined time after receiving any first code signal combination to foil tampering by an unauthorized person using a count generator.

7 Claims, 11 Drawing Figures

SAFEGUARD OR LOCK DEVICE

This is a continuation of application Ser. No. 915,403 filed June 14, 1978.

The invention relates to a safeguard, lock or bolting device with which the setting in operation of a machine is to be made impossible or at least rendered difficult, which is set in operation indirectly or directly by means of electrical energy.

Most working machines, especially vehicle motors, are set in operation over an electric or hydraulic starting motor to the input side of which there is engaged a valve to be actuated electrically or an electric switch. The safeguards against unauthorized use consist mostly in that the switch itself or an operating switch engaged on entry side of the electromagnetic switch is combined with a mechanical lock, so that the machine can be set in operation by the key. A setting in operation, however, is also possible by establishing a parallel current path to the switch combined with the key. For motor vehicle thieves this type of starting the motor is an easy one.

Another type of safeguard, such as is used especially for bicycles, is the so-called number combination lock. The code permanently put into the number lock can in many cases be felt out; when the unauthorized person has thus detected the code, he can operate the number lock in just the same way as the authorized person. In the one case as in the other, the functional elements that are required for the starting or turning on or setting in operation of the protected object or protected machine are accessible with a usual tool or possibly with application of little force and with acceptance into the bargain of little damage. Correspondingly, the desired safeguard is extremely imperfect.

The object of the invention is the elimination of the aforementioned disadvantages. The advantages achieved with the invention, which may be regarded simultaneously as the aim of the invention, are evident from the further description.

The device invented for the safeguard of a machine against being set in operation improperly, namely a motor to be set in operation by means of a key device over an electrical switch, is distinguished in that the key device presents a code signal generator and a code signal receiver, that the code signal to be generated by a fitting key consists in a combination simultaneously of electrical states to be transmitted simultaneously between the code signal generator and the code signal receiver, that the key and the code signal receiver are set on the same code, that the receiver is assembled with the switch and possibly the motor in such a manner that the functional connection between them is difficultly accessible, and that the receiver releases the switch only on reception of the signal corresponding to the set-in code for the setting in operation of the machine. The invention may also be seen, in other words, in that the code required for the releasing is present exclusively in the code signal receiver and that this is installed just an inaccessibly as the elements of the machine that are necessary for the setting of the machine in operation. The code signal generator is neutral; only through the use of the key that contains code set in the code signal receiver is the combination forming the code generated and supplied to the receiver. The receiver is a passive construction element the code setting of which cannot be scanned from outside. The code receiver responds, therefore, only a certain signal combination in such a way that it operates the switch, which indirectly or directly sets in operation the machine to be protected. What is important here is that the path of connection between receiver and switch and that between the switch and the machine (for example a starter) is not easily accessible. As safeguard against theft it suffices in many cases that the thief would be compelled to change parts of machines. To prevent a motor vehicle theft it could suffice, therefore, to embox the code signal receiver, the starting switch and the starter correspondingly so that a changing of the starter would be impossible to get around.

The effectiveness of the safeguard can be increased by the means that the code receiver controls not only the starting switch proper, but instead of this or simultaneously an internal bolting, namely a bolting that safeguards the casing in which the functional parts mentioned are locked from inside. Thus, for example, a bolt inaccessible from outside could be connected by an electromagnet in the interior of the casing receiving the above-mentioned functional parts to the output of the code signal receiver in such a way that the magnet responds and accordingly unbolts the casing only if it receives a corresponding signal from the code signal receiver, which signal is given off on reception of the correct code from the receiver. It is also possible from one code signal generator to approach several code signal receivers. From one code signal receiver, as already shown above, several safeguarding elements, bolts and switches can be controlled, i.e., released or blocked.

Theoretically the thought of the invention can also be realized with other than electrical magnitudes. Instead of electrical states, for example, also optical states can present the code. This would be possible, for example, through photoconductors instead of electrical conductors.

The invention is explained in detail below with the aid of an example of execution with reference to the appended drawing. In the drawing.

Figure 3:
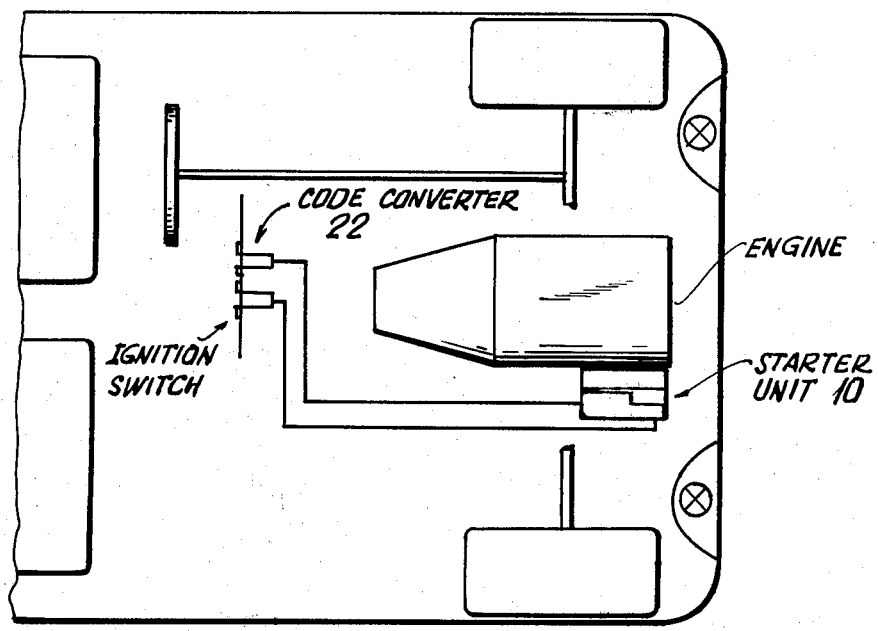
Figure 4:
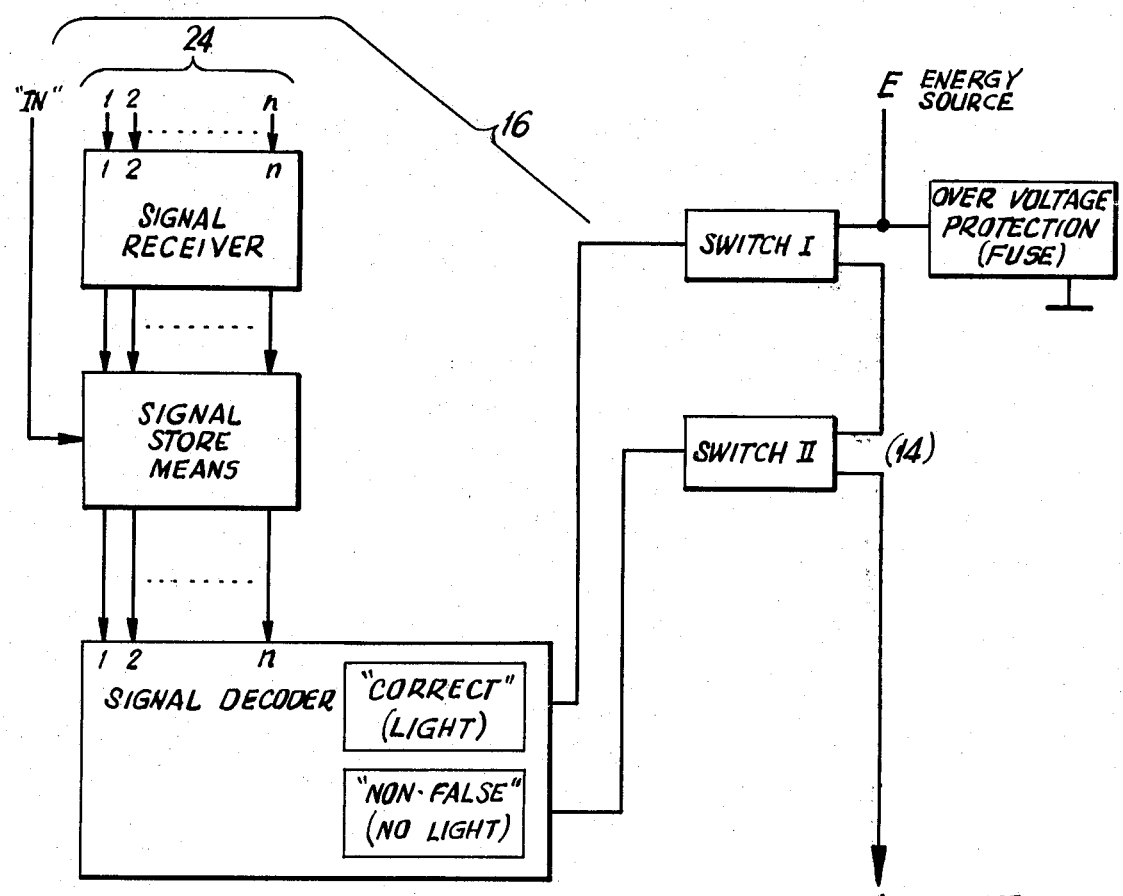

FIG. 3 schematically shows the arrangement of the code converter, the ignition switch and the starter unit in the motor vehicle;

FIG. 4 shows the signal receiver and the signal starter of the starter unit in a block diagram.

The invention is explained in an example of a device for making difficult the theft of a motor vehicle.

The starter of the motor vehicle is seated in a casing 10, which accommodates, besides the starter 12, the normally present switch 14 switching on the starter and a code signal receiver 16. The casing 10 is, moreover, solidly joined with the motor vehicle, for example, by several screws. Between the casing interior and the outer space there are only three connections, namely, in the first place, the mechanical connection from the starter to the shaft of the motor to be started, then the lead-through 18 for the electric energy for the starter, the operation of the electromagnetic switch and the feed of the code signal receiver and, finally, the input 20 for the code signal.

Figure 1:
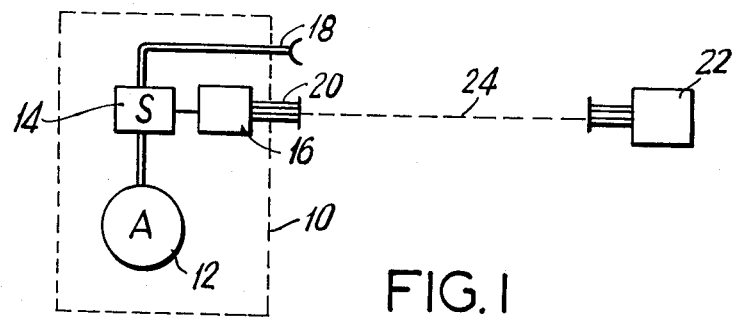
FIG. 1 shows the starter unit containing the starter, starter switch and code signal receiver in relationship to the code signal generator according to the present invention.

From the information transmitter or code signal generator 22 shown in FIG. 1 there is given to a sufficiently large number of lines 24 a suitable signal combination, which is generated in the information transmitter 22 through its corresponding setting.

The transmitter or signal generator is designed in such a way that it can address various functional elements within protected zones. It can, for example in addition to the control of the switch 14 switching the start, block the ignition coil, for example by the means that further decoders or code signal receivers are present together with a switching element inside the ignition coil; thereby a motor vehicle could be safeguarded also against starting by pushing. There are, therefore many kinds of combinations possible within the basic thought of making the code secure against scanning by the means that the code acquires a physical form only through the corresponding setting of the code signal generator, and, further, through the measure of housing the receiver of this code, which transforms it into a releasing for setting the motor in operation in a place that is accessible only with difficulty.

The code information from the information transmitter or code signal generator to the code signal receiver that delivers the releasing signal was chosen as a parallel input, so that a circuit not subject to breakdown can be used, which operates without rhythm. Since in the motor vehicle the path or paths from the dashboard to the starter and possibly to the ignition coil are only short, the expenditure necessary through the multiwire structure of the code signal transmission cable is low.

Figure 2A:
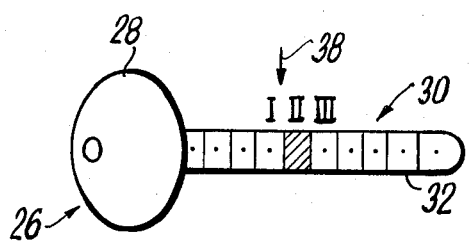
FIG. 2a shows a code transmitter key according to the present invention.

Motor vehicles are ordinarily started by means of a key. The key is here, in contrast to "code" a physical object, namely that which detached from the "lock", therefore detached from the object of safeguarding, can be carried along by a person and permits to that person alone the access to the safeguarded object. In the present case there is used as code transmitter either the key provided for the motor vehicle itself, into which the code transmitter proper is integrated, or the code transmitter consists of an object that has the conventional outer form of a key. In order to make impossible a copying of the code transmitter by sight or by scanning or at least to make it difficult, it is possible, as hereby proposed, to use a code transmitter active in the infrared range. The code transmitter here briefly designated as "key" may have, say, the form shown in FIG. 2a, according to first appearance, therefore, the form of a conventional motor vehicle key. It consists of a flat plate of low, uniform thickness with a grip part 28 and a bit part 30. The bit part 30 of the code transmitter 26 contains inside a rigid frame 32, lying adjacent in longitudinal direction, several fields, of which only a part is permeable to infrared light, whereas the remaining fields are impermeable to light. The distribution of the permeability and impermeability presents the code. For the generation of the code signal the bit 30 of the code transmitter is thrust into the code signal generator device. With the introduction a switch is operated, and namely not until the key is inserted entirely into the signaler and has, therefore, reached its desired position. This switch puts the safeguarding device on the supply voltage.

Other devices for the energy supply of the safeguarding device are, of course, conceivable, for example the use of a rotary switch that can be operated only when the "key", therefore the code transmitter, is entirely introduced.

Figure 2B:
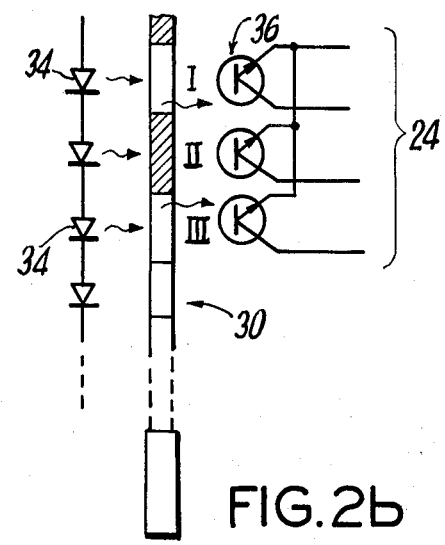
FIG. 2b shows the relationship between the key of FIG. 2a and the parts of the code signal generator.

The code signal generator consists essentially of a series of light-emitting diodes and a second series of phototransistors. The elements of both series, therefore of the diodes 34 and of the transistors 36, are in a straight row and arranged in such a way that the two series lie parallel to one another. There in each case a diode 34 and a transistor 36 stand opposite one another in pairs. The position of the individual pairs 34, 36 of diode and transistor on the length of the row corresponds to the spacings or widths of the coding fields of the code transmitter 26. Preferably equal spacings are used, although different spacings are also possible. At any rate it is assured that with the code transmitter introduced all the way, between each diode-transistor pair one of the code pieces of the key bit 30 lies unambiguously. In the drawing according to FIG. 2b there are shown for explanation three photo-transistors and, correspondingly, three diodes, each of these elements in its row. Between the two rows there is introduced the key bit 30, which is shown in FIG. 2b in longitudinal section and in viewing direction of the arrow 38. The diode-transistor pairs are designated with I, II and III. Between the two elements (diode and transistor) of the pair I there lies a field permeable to infrared light of the bit. The same holds for the diode pair III. Between the elements of the pair II there is a field impermeable to infrared light. The light emission of the diodes comprises also the spectral range that is picked up by the phototransistors passed through the permeable fields of the key bit, in the present case, therefore, infrared. After the introduction of the code transmitter, accordingly, the phototransistors of the pairs I and III receive infrared light, which they convert into corresponding signals at their outputs, while the transistor of pair II is not activated. As indicated by the connections of the electrodes, the transistors lie electrically parallel. On the output lines there appears, accordingly, as signal combination the code delivered by the code transmitter. This is supplied in the above described manner over the lines 24 to the code signal receiver 16, which, in a circuit easily to be realized, triggers the release and operation of the starter over the switch 14.

The code signal generator described is in its construction independent of any code. By means of a differently coded code transmitter another code would be generated. Because the code signal generator is neutral and does not yet contain any code, neither can the code be derived from it to which the code signal receiver responds. Only the possession of the key permits the generating of the correct diode and thereby the control of the code signal receiver.

Theoretically any type of binary-operating information transmitter is suited for the described problem. Thus, instead of phototransistors and photo-diodes there could be used, for example, magnetic cards with corresponding converter elements. Likewise the use of punch cards or punch strips with mechanical or photoelectric scanning is possible.

The application of the principle here described is not restricted to the safeguarding of motor vehicles. The principle can be used even independently of electrical energy because what is essentially is mainly the inaccessibility or difficult accessibility of the code signal receiver and its connection to the bolting and releasing elements the generation of the code signal only by introduction of the key or code transmitter.

Instead of electrical transmission lines there can be used, for example, also photoconductors for the transmission of a corresponding code signal.

Since in a device like that described the releasing code is present and set exclusively in the logic of the code signal, but not in any of the easily accessible parts of the device, nor in the code signal transmitter, therefore, it is also possible to set the code signal in the code signal transmitter or generator by a setting device from memory, therefore without use of a physical object containing the code. Preferably there would then be used a digital setting device which loses its setting after the setting in operation of the protected device or generally after use, so that the authorized person does not need to take care to change or restore the setting made again, so that the code cannot be read off by unauthorized persons from the setting.

A further feature, in practical use under some circumstances very important, is the use of a time member in the code signal receiver; the time member has the function of preventing with certainty an unauthorized person from hitting upon the correct code through input of a sequence of very rapidly changing signal combinations, therefore also the combination that causes the receiver to respond. The time member is to be designed and used in correspondence to this problem. It can be located at the entrance of the signal receiver in such a way that after arrival of a signal combination it blocks the forwarding of the following signal combination for a prescribed time. It can also fulfill its function, however, if it is interposed between the output of the code signal receiver and the elements engaged on outlet side. A time member is especially favorable to retain the state brought about by the incoming signal for a certain time, for example several minutes, therefore either the state "release" in the case of correct code or the state "continue to block" in the case of false code. The retaining also of the state "release" can also be reasonable, because the "key" for the invented safeguarding device must under some circumstances immediately be separated again from the code signaler, say, because it is on the same keyring there also hangs the likewise needed key for a steering wheel lock, a glove compartment lock or the like.

In the event of doubt, all the features here described and/or represented by themselves or in any reasonable combination are essential to the invention. Protection is sought for what is objectively protectable.

The device—called in brief "safeguard"—offers protection against setting in operation by an unentitled person even if the unentitled person knows not only the presence of the safeguard and the place of its installation in the motor vehicle exactly, but also the manner of functioning. For the entitled user the excess cost for the service in daily use should be negligibly low. The unentitled person, however, is to be compelled to resort to such complicated mechanical manipulation that he gives up his intention.

The following special description concerns itself with the invented safeguard for a motor vehicle with automatic gear.

Figure 1A:
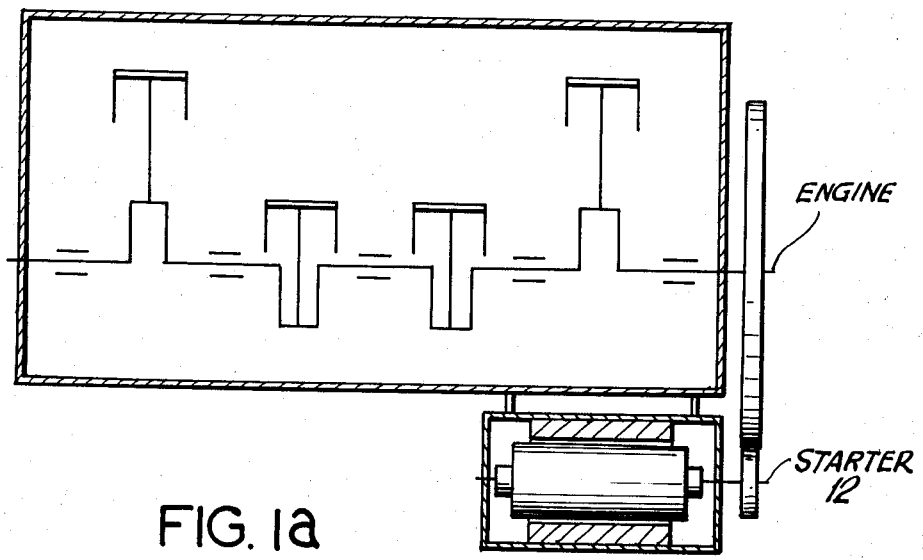
FIG. 1a shows the engine mechanically joined to the starter.
Figure 1B:
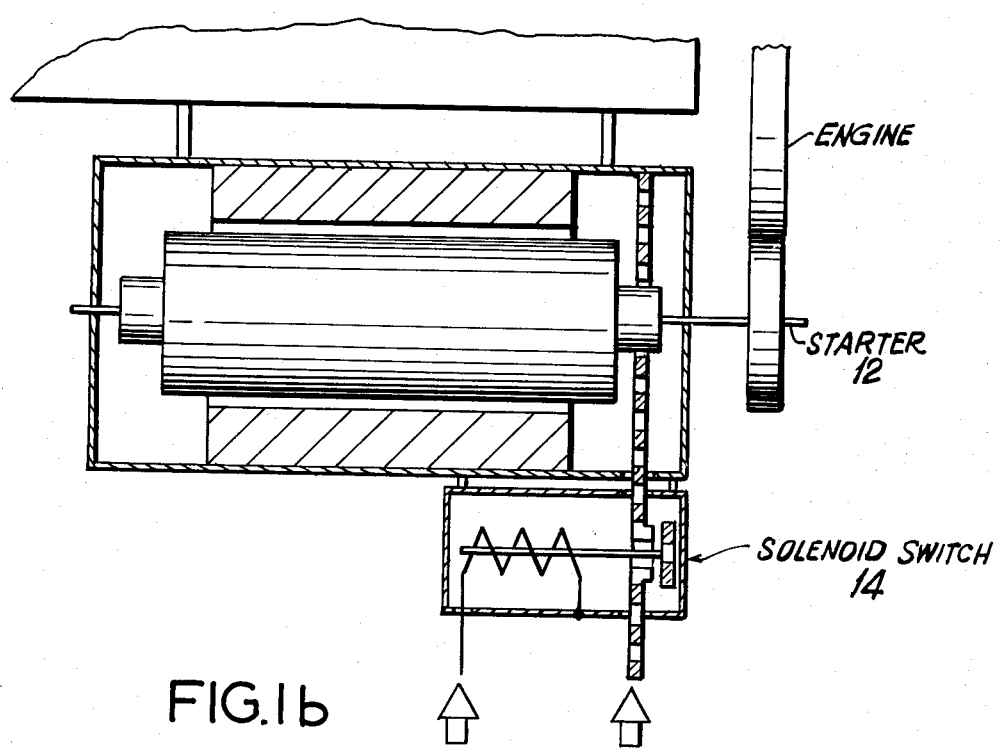
FIG. 1b shows the starter additionally connected to the starter switch.

Motor and starter (FIG. 1a) are mechanically joined with one another. Further, starter and magnetic switch are connected (FIG. 1b).

Figure 1C:
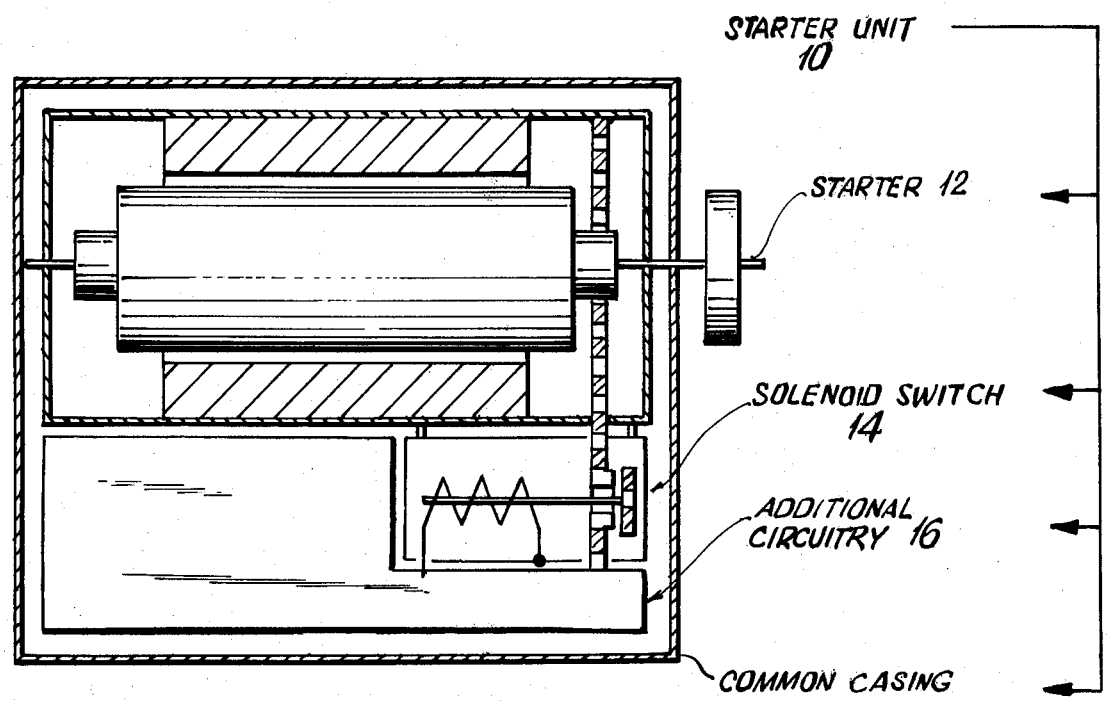
FIG. 1c shows the common casing for the starter unit.

In new production of a starter the safeguard described and still be described can be built into the starter. If a subsequent equipping of the vehicle with the new safeguard is intended, for the starter on hand there is obtained a casing that encloses the starter, the magnetic switch and an additional circuit (see FIG. 1c), and, namely in such a way that the common casing can be removed only after disassembling of the starter.

The additional circuit is of such a nature that it allows the magnetic switch to become active only if it has previously received a certain signal. For the functioning of the starter, therefore, two conditions have to be fulfilled: operation of the starting switch and giving off of a signal.

Figure 1D:
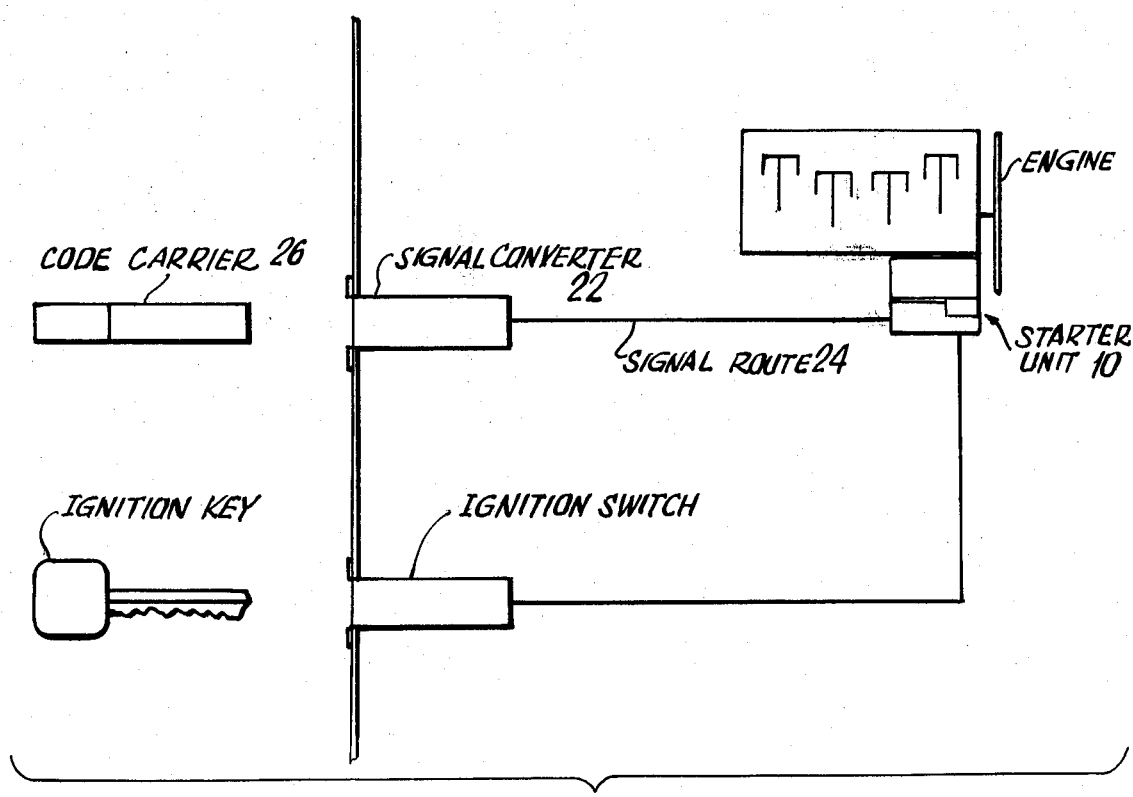
FIG. 1d shows the relationship of the code carrier and ignition key with respect to the starter unit.

The signal converter is permanently built into the dashboard of the motor vehicle (FIG. 1d). It converts the information impressed in the signal carrier into a type of signal suited for the additional circuit. If the signal carrier receives a false information item, i.e., one that is not accepted by the addition circuit, the signal carrier is not the right one and it generates correspondingly in the converter a false signal. The testing of the signal for correctness is carried out exclusively in the additional circuit. Consequently the correct signal cannot be picked up in the converter which is in general accessible. FIG. 3 schematically shows the installation of the arrangement in the motor vehicle.

The signal paths from the transmitter to the starter unit are short. The excess costs for a multiwire cable are low. Accordingly, it is possible to process the data in parallel and the time constant can be chosen long. A timer is not required. Accordingly, ignition disturbances and temperature fluctuations can easily be compensated for.

Figure 2C:
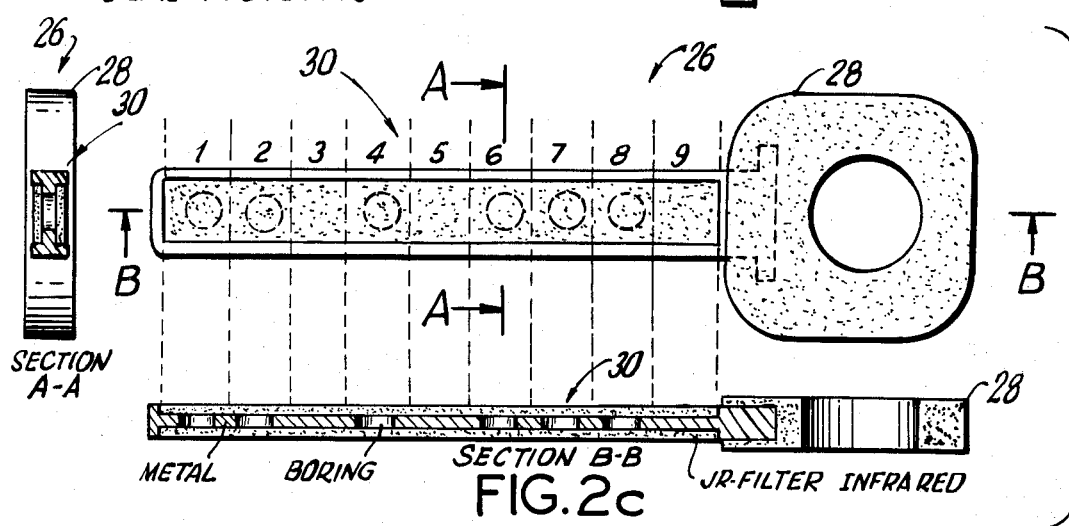
FIG. 2c shows a conventional key provided with a signal disposed in bores of the key to provide a code according to the present invention.
Figure 2D:
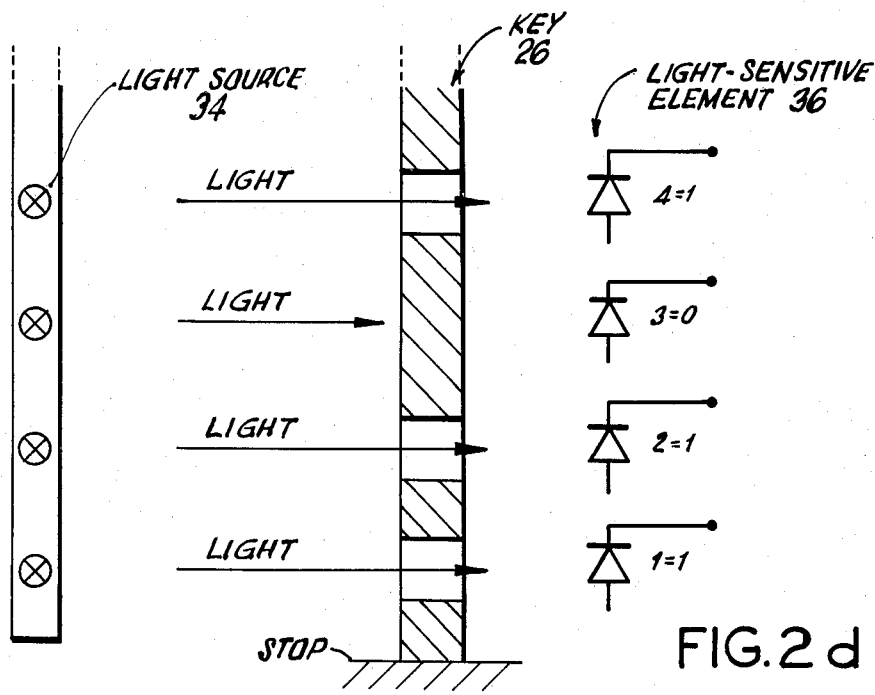
FIG. 2d shows the relationship between the key of FIG. 2c and the parts of the code signal generator.

The signal consists of signal carrier and signal converter. The signal carrier may have the form of a conventional key (FIG. 2c), into which the signal is imprinted by bores in the individual zones. The distribution of the bore holes determines, therefore, the code. The sections "A" and "B" show how the bores can be covered off by infrared filters to that the code cannot be discovered already solely by viewing the "key". The signal converter consists of a light source and of a row of photosensitive construction parts, for example photodiodes or phototransistors; the "key" is introduced before setting in operation between light source and the row of photosensitive construction parts up to a defined stop. Thus, the coded signal is generated that allows the additional circuit to respond.

The construction groups of the additional circuit are represented in FIG. 4. The first construction group is the signal receiver, which has several functions. It is to pass on the information without retroaction to the signal storer. Further it is executed in a type of circuit that assures that the receiver cannot be bridged over by electrical manipulations, for example by brief application of an over-increased voltage to the circuit inputs.

The next construction group, the signal storer, stores the input signal for several minutes. Only after expiration of a storage period can a new signal be stored. Thereby two things are achieved:

1. The correct signal combination cannot be bound by rapid and systematic trial, for example by means of a count generator with correspondingly designed outputs. With five minutes of storage time and 2500 combinations there is yielded a "trial time" of 8½ days if the key has 12 fields.

2. In consequence of the storage time, the two keys, namely the code or signal carrier and the ignition key can without objection be carried in common on a keyring. This facilitates the daily use.

The next construction group is the signal evaluator, which checks whether the signal present on the input of the construction group, therefore the one conveyed from the signal storer, agrees with the imprinted signal. The two generated initial conditions "correct" and "not false" then lead in each case of a separate switching stage. This corresponds to a logical AND-linkage. The safeguard switching stage further indicated in the block circuit diagram 4 is suitable in semiconductor circuits as excess voltage protection. It prevents a violent release of the current path "E-A".

The new safeguard system can, of course, be combined with alarm means in a conventional manner.

The new device offers the possibility of forming all the elements first of all alike in the manufacture, so that no coding is yet present. This is undertaken only following upon the manufacture. This coding can take place in such a way of several elements, each of which in the finally coded state contains the code by itself, for the present only one is provided with the code; only on first setting in operation are the other element groups coded by use of the signal and code carrier. These may, for example, be signal paths that are separated in the first setting in operation and then remain separated. Such signal paths may, for example, be burned through in the first setting in operation. Thus, for example, diodes can be circuited in such a way that they are so damaged by the first current thrust that they interrupt their current path. One could, however, also consider placing the entire coding in the process of the first setting in operation.

The arrangement described requires no tuning of any kind, therefore no frequency tuning either.

I claim:

1. A device for safeguarding an engine against unauthorized use, said engine having a starter therefor, and a starter mechanism switch for switching on said starter, said device comprising:
    a code signal receiver located in an immediate vicinity of said starter and said starter mechanism switch, said code signal receiver including a decoder to determine an authorized pre-selected code signal combination, said decoder including means for engaging the starter mechanism switch for activation;
    means for encasing said code signal receiver, said starter and said starter mechanism switch together within a unit structure to prevent access thereto;
    said unit structure having only three connections extending from an interior thereof, a first of said connections being a mechanical connection from said starter for starting said engine, a second of said connections being lead lines for providing electrical energy to said starter, said starter mechanism switch and said code signal receiver, and a third of said connections being a code signal input line to said code signal receiver;
    a neutral code signal generator for generating a code for transmission through said code signal input line to said code signal receiver, said code signal generator being spaced from said unit structure and being of relatively easy access to an authorized user of the engine;
    said code signal input line providing means for electronically connecting said code signal generator to said code signal receiver;
    code transmitter means for creating said authorized pre-selected code signal combination upon engagement with said code signal generator, which pre-selected code signal combination is thereupon electronically transmitted by said code signal generator to said decoder of said code signal receiver so that said decoder activates said starter mechanism switch; and
    said code signal receiver further including time delay means to block forwarding of a following code signal combination for a predetermined time after receiving any first code signal combination to foil tampering by an unauthorized person using a count generator.

2. A device according to claim 1, wherein said code transmitter means includes:
    a portable body having a configuration of a key provided with a flat plate of narrow width and containing a grip part and a bit;
    the bit comprising several longitudinal sections, said sections comprising a pre-selected distribution of light permeable portions with remaining sections of the bit being light impermeable.

3. A device according to claim 2, wherein said key is a motor vehicle key having said several longitudinal sections on a rigid frame, said sections being disposed adjacent to each other in a side by side arrangement in a lengthwise direction of said bit.

4. A device according to claim 2, wherein said permeable sections include means permeable to light only in an infrared wavelength range to conceal distribution of said permeable sections from light in other ranges.

5. A device according to claim 4, wherein said code signal generator includes means for transmitting light in the infrared wavelengths range for coaction with said permeable sections of said key.

6. A device according to claim 1, wherein said code signal generator includes a spaced apart parallel series of light emitting diodes and phototransistors for insertion of said code transmitter means therebetween with each diode and phototransistor being spaced apart opposite one another to define a pair, each pair of diode and phototransistor being positioned to proportionally correspond to positioning of individual longitudinal sections of said code transmitter means, whereby after insertion of said code transmitter means into said code signal generator, selected phototransistors receive the light generated by the diodes which passed through light permeable portions of the code transmitter means, and the remaining phototransistors do not receive any light, such sequence of light transmission to the phototransistors defining the code generated by said code signal generator.

7. A device according to claim 1, wherein the code generated by said code signal generator is determined by a selection of a series of digits displayable upon said code transmitter means.

* * * * *